United States Patent [19]

Van Nordstrand

[11] 4,394,253

[45] Jul. 19, 1983

[54] HYDROCARBONS HYDROPROCESSING WITH IMOGOLITE CATALYST

[75] Inventor: Robert A. Van Nordstrand, San Rafael, Calif.

[73] Assignee: Chevron Research Company, San Francisco, Calif.

[21] Appl. No.: 78,867

[22] Filed: Sep. 26, 1979

[51] Int. Cl.³ .............................................. C10G 45/08
[52] U.S. Cl. ............................ 208/251 H; 208/254 H; 208/264; 208/216 PP; 208/110
[58] Field of Search ............. 208/251 H, 216 PP, 264, 208/254 H, 110

[56] References Cited

U.S. PATENT DOCUMENTS

| | | | |
|---|---|---|---|
| 3,235,512 | 2/1966 | Koepernik | 252/477 R |
| 3,706,658 | 12/1972 | Hass et al. | 208/109 |
| 3,891,541 | 6/1975 | Oleck et al. | 208/251 H |
| 3,898,155 | 8/1975 | Wilson | 208/251 H |
| 3,979,279 | 9/1976 | Yan | 208/264 |
| 4,098,676 | 7/1978 | Robson | 208/111 |
| 4,119,531 | 10/1978 | Hopkins et al. | 208/251 H |
| 4,152,250 | 5/1979 | Inooka et al. | 208/251 H |
| 4,152,404 | 5/1979 | Farmer | 423/329 |
| 4,166,026 | 8/1979 | Fukui et al. | 208/216 PP |

Primary Examiner—Charles F. Warren
Assistant Examiner—Joseph A. Boska
Attorney, Agent, or Firm—D. A. Newell; S. R. Lapaglia; C. L. Hartman

[57] ABSTRACT

A catalyst composition including imogolite and its use in hydrogen processing hydrocarbons are disclosed.

14 Claims, No Drawings

HYDROCARBONS HYDROPROCESSING WITH IMOGOLITE CATALYST

BACKGROUND OF THE INVENTION

The present invention concerns a catalyst composition and its use for hydrogen processing hydrocarbons. In one specific aspect, the invention concerns a catalyst containing the fibrous form of the mineral imogolite and its use for demetalizing and deasphalting heavy petroleum fractions.

Heavy hydrocarbon fractions such as petroleum residua, bitumen, coal and shale oils, and the like, are known to contain substantial amounts of contaminants such as sulfur, nitrogen and metals, especially nickel and vanadium. Such heavy fractions also typically contain a substantial fraction of heat-sensitive, normal heptane-insoluble hydrocarbonaceous material conventionally termed "asphaltenes".

It has been suggested to upgrade contaminated heavy oil fractions by hydrogen processing in order to remove the metals, sulfur and nitrogen, but the presence of asphaltenes in the oils often has an adverse effect on the activity of conventional hydroprocessing catalysts. Another problem encountered in conventional heavy oil hydroprocessing when large concentrations of metals are present in an oil, is that the metals tend to deposit rapidly on the catalyst surface and plug the pores of conventional hydrogen processing catalysts, with a consequent loss of catalytic activity for sulfur and nitrogen removal. This has led to the suggestion that demetalizing guard beds should be used upstream of a hydrodesulfurizing and/or hydrodenitrifying reactor.

Because of the tendency of metals to deposit on the surfaces of hydrocarbon processing catalysts during processing of heavy oils and the tendency of metals to plug the pores of the catalysts, it is desirable to employ a hydrodemetalation catalyst having a large fraction of its total pore volume provided by pores having a diameter of greater than 200 Angstrom units, which are termed "macropores" herein. Manufacture of satisfactory catalysts with a substantial fraction of total pore volume in macropores is difficult, in that most catalysts with a satisfactory pore size distribution for demetalation are quite deficient in crush strength and attrition resistance. The shaping procedures used for forming suitable catalytic bodies also often have an adverse effect on the macropores content of catalysts.

In order to overcome the adverse effects of asphaltenes on hydrogen processing catalysts, e.g. from rapid coking and from inhibition of hydrodesulfurization, it has been suggested to use a solvent treatment to separate asphaltenes prior to hydrodesulfurization or hydrodenitrification. The non-asphaltenes may be dissolved in a liquefied light aliphatic, such as propane, while the insoluble asphaltenes are rejected. Not only is solvent deasphalting relatively complex and expensive, but it also has the disadvantage of rejecting potentially valuable hydrocarbonaceous materials, since asphaltenes can potentially be at least partially converted by hydrocracking, catalytic cracking and the like. Thus, the larger the fraction of asphaltenes in a given oil, the less attractive solvent deasphalting becomes.

U.S. Pat. No. 4,152,250 suggests the use of a catalyst containing sepiolite (Meershaum) and transition metals and/or Group IIB metals for hydrotreating and hydrodemetalizing hydrocarbons. Sepiolite is a magnesium silicate clay.

U.S. Pat. No. 4,166,026, suggests a two-stage process for hydrogen treating heavy hydrocarbon oils. In the first stage, a catalyst is employed which contains such naturally occurring magnesium silicates as sepiolite, attapulgite or palygorskite or synthetic products closely related to these minerals in composition and structure, supporting metals from Groups VA, VIA and VIII. employed. The catalyst employed in the second conversion stage uses a carrier having at least 90% of its pore volume provided by pores having diameters of 35-200 Angstrom units, supporting metals from Groups VA, VIA and VIII.

The catalysts using magnesium silicates as supports which are described in U.S. Pat. No. 4,152,250 and U.S. Pat. No. 4,166,026, are preferably prepared by grinding the mineral to small size particles and then kneading an aqueously moistened dough formed from the mineral, after which the support is shaped.

Imogolite is a naturally occurring, clay-like mineral which has a fibrous, thread-shaped morphology. It is described on pages 359-364 of The Electron-Optical Investigation of Clays, J. A. Gard Ed., published by the Mineralogical Society, Great Britain (1971). Its composition is approximately $1.1\ SiO_2 \cdot Al_2O_3 \cdot 2.3$ to $2.8\ H_2O$. It can be synthesized, for example, as described in Belgian patent publication No. 865,317.

SUMMARY OF THE INVENTION

In one embodiment, the present invention concerns a catalyst composition comprising shaped catalytic bodies including (1) dispersed rods of fibrous form imogolite; and (2) at least one porous refractory inorganic oxide gel, the gel bonding the imogolite rods together in a rigid, substantially random mutual orientation in the catalytic bodies.

In another embodiment, the present invention concerns a process for hydrogen treating a hydrocarbon feed by contacting the feed, at hydrogen treating conditions, with a catalyst composition comprising shaped catalytic bodies including (1) dispersed rods of fibrous form imogolite and (2) at least one porous refractory inorganic oxide gel, the gel bonding the imogolite rods together in a rigid, substantially random mutual orientation in the catalytic bodies.

I have found that a shaped catalyst for hydrogen processing hydrocarbons possessing surprisingly high crush strength and attrition resistance, and having an advantageously high proportion of its total pore volume in 200-1000 Angstrom macropores, can be provided by employing dispersed rods of fibrous form imogolite as a matrix, skeleton or framework in the catalyst particles. The imogolite rods are bonded together, using a suitable refractory inorganic oxide gel, such as silica or alumina, in random orientation to form the rigid, three-dimensional matrix. Shrinkage and deformation of the microporous gel binder during drying of the catalyst particles provides a large fraction of 200-1000 Angstrom macropores in the catalyst, while the rigid framework of imogolite rods provides the catalyst bodies with excellent mechanical strength properties such as crush strength and attrition resistance. The catalyst provides excellent hydrodemetalation and hydroconversion of asphaltenes, and can be used in conveniently larger-sized catalytic bodies without encountering the diffusion and mechanical strength problems found in previous catalysts.

DETAILED DESCRIPTION OF THE INVENTION

The catalyst composition employed in the present invention includes two essential components: (1) dispersed rods of fibrous form imogolite, and (2) an inorganic oxide gel for bonding the rods.

The fibrous or thread-like form of imogolite is available in natural deposits. It can also be synthesized, if desired, in a known manner. In its natural state imogolite often comprises bundles of threads, rods or needles consolidated or bonded together weakly in parallel orientation. In order to make the imogolite suitable for use in the present catalyst, bundles of parallel, consolidated rods must be broken up, so that the imogolite rods are unconnected, or dispersed. As used herein, the term "dispersed rods", means imogolite rods which have been substantially completely disassociated from other rods, so that each imogolite rod is freely movable with respect to other rods. Dispersal of the rods can be accomplished, when necessary, by grinding, milling, kneading and the like. It is strongly preferred that dispersal is carried out in the presence of an aqueous hydrogel or sol precursor of the inorganic oxide gel component, with the imogolite being worked as a slurry. For example, a colloid mill can be used satisfactorily in many cases to disassociate the individual rods. Dispersion is facilitated by mechanical agitation of the imogolite in an aqueous medium. A dispersion procedure can conveniently be carried out in the presence of an aqueous precursor of the inorganic oxide gel component, as by milling a slurry of fibrous imogolite in the presence of an inorganic oxide precursor gel.

Preferably, the imogolite rods used in the catalyst have a length to diameter ratio of about 5:1 to about 100:1. The rod diameter, for this purpose, is taken as the largest diameter of the rod normal to the length. If the average length:diameter ratio of available rods is higher than desired, it can be decreased by grinding the imogolite to a finer particle size.

The length of imogolite rods used in a catalyst is also preferably maintained within a range proportionate to the size of the catalytic bodies, or particles, to be formed from the imogolite and inorganic oxide. If the length of the rods is too great in comparison to the average diameter of the catalyst bodies to be formed, then the shaping procedure can tend to cause a uniform, parallel mutual orientation of the imogolite rods in the shaped catalyst. This is particularly the case when extrusion is used for shaping. Preferably, the average length of the imogolite rods used is between about 2% to about 10% of the average diameter of the shaped catalytic bodies into which the catalyst is formed. Rods shorter than 2% of the catalyst particle diameter are usually quite satisfactory, but rods larger than 10% are usually not satisfactory.

In addition to the imogolite component of the present catalyst, a porous, refractory inorganic oxide gel component is also used. Suitable refractory inorganic oxide gels are well known to those skilled in the art. Examples of suitable inorganic oxides are silica, alumina, magnesia, zirconia, titania, boria, and the like. Mixtures of two or more inorganic oxides are also suitable. Preferred inorganic oxides are silica, alumina and silica-alumina. The gel material preferably has a substantial fraction of its total pore volume in micropores having pore diameters in the range from 1 to 200 Angstrom units. The inorganic oxide gel may be provided or derived from a natural material such as a clay or may be a synthetic material such as synthetic silica-alumina cogel. Suitable additional materials which may be used include kaolin clays, bentonite clays, the type of layered clays discussed in U.S. Pat. No. 3,252,757, U.S. Pat. No. 3,252,889 and U.S. Pat. No. 3,743,594, montmorillonite clays, halloysite clays, etc.

The dispersed imogolite rods and the inorganic oxide gel may be combined in any suitable conventional manner. For example, the rods may be added to an aqueous solution of a precursor of the inorganic oxide, after which a hydrogel of the inorganic oxide is formed, and the resulting mass is then shaped and dried conventionally. Or, the imogolite component can be added to a previously precipitated hydrogel which has not hardened, and the rods and gel can be mechanically mixed prior to shaping. Another suitable combination technique is to combine the rods with a properly peptized powder of an inorganic oxide, again with mechanical mixing to homogenize the resulting mass.

Preferably, the amount of the inorganic oxide component is about 10 weight percent to about 50 weight percent or between 30 and 50 weight percent of the amount of the imogolite rods in the final catalyst composition.

An essential function of the inorganic oxide gel component is to act as a bonding agent for holding or bonding the imogolite rods in a rigid, three-dimensional matrix or skeletal arrangement. The inorganic oxide provides a rigid link between the imogolite rods, which are randomly oriented in a three-dimensional mutual orientation. The resulting rigid skeletal framework provides a catalyst body with high crush strength and attrition resistance.

After a mass of mixed imogolite and inorganic oxide gel, e.g. as a hydrogel, or other gel precursor has been shaped into the desired form, as by extruding, pilling, hot oil sphere formation or like conventional technique, the resulting catalytic bodies may be dried and/or calcined in a conventional manner, if desired. Extrusion is a preferred shaping technique for forming the present composition into suitable catalytic bodies.

When conventional catalyst bases, such as inorganic oxide gels, are heated during drying and/or calcination, the microporous inorganic oxide component tends to shrink, resulting in a catalyst which is structurally stable, but which has few pores with diameters greater than 200 Angstrom units. The presence of the imogolite framework, or matrix, in the present catalyst prevents such uniform shrinkage of the gel component. The result is a catalyst with a large fraction of its pore volume provided by pores with diameters in the range from 200 Angstroms to 1,000 Angstroms. Preferably, the relative proportions of the imogolite and inorganic oxide gel components in the catalyst (and the proportion of catalytic metals, if used) are adjusted so that the final catalyst bodies have at least 40% of their total pore volume supplied by pores with diameters between 200 and 1,000 Angstroms. Pore size distribution and pore volume may be determined by the mercury porosimitry method, as described in U.S. Pat. No. 3,853,789, or, if appropriate, by the BET nitrogen adsorption method described in JACS 60, 309 (1939) and 73,373 (1951). Pores in the 200–1000 Angstrom range are particularly suitable when the present catalyst is employed in the preferred use, hydrodemetalation and and hydroconversion of asphaltenes in heavy oils. The total surface area of the present catalysts is not particularly critical for most uses; however, a surface area between about 10 and 200 square meters per gram is preferred.

The catalyst may also include one or more known catalytically active metals, such as transition metals. A metal component can be added to the imogolite and inorganic oxide during formation of the shaped catalyst bodies, as by including an aqueous solution of the metal in an aqueous liquid used for forming a hydrogel of the inorganic oxide or by comulling a solid metal-containing powder with the inorganic oxide and/or imogolite components prior to or after the imogolite and inorganic oxide are combined. Alternatively, a catalytically active metal can be added to the catalyst particles after shaping and preferably after stabilization of the catalyst bodies by drying and calcination.

One preferred group of catalytically active metals for use in catalysts of the invention is the group including chromium, molybdenum, tungsten and vanadium. Preferably one or more of these metals is present in the catalyst in a total amount of 0.1 to 10 weight percent of the total catalyst weight, including the catalytically active metal or metals.

Another preferred group of catalytically active metals for use with the present catalyst is the group including iron, nickel and cobalt. Preferably, one or more of these metals is included in the catalyst particles in a total amount of from 0.1 to 10 weight percent of the total catalyst weight, including the catalytically active metal or metals.

Particularly preferably, the catalyst particles include from 0.1 to 10 weight percent of at least one metal from both of the preferred groups. Combination of molybdenum and cobalt, molybdenum and nickel, tungsten and nickel, vanadium and nickel are examples. The catalytically active metals may be present in reduced form or as one or more metal compounds such as the oxide, sulfide or sulfate.

The catalyst can be used for converting or treating hydrocarbons in processes such as catalytic cracking or some types of demetalation, which are carried out in the absence of added hydrogen; however, the catalyst is particularly adapted to hydrogen consuming processes. Therefore, according to the invention, the catalyst is employed for hydrogen treating a hydrocarbon feed. The catalyst is versatile and can be used for a variety of hydrogen treating operations on a wide selection of hydrocarbon feeds. Preferably the hydrocarbon feed is a heavy oil or fraction such as a crude oil, petroleum atmospheric or vacuum distillation residuum, coker distillate oils, heavy petroleum cycle oil, synthetic oils or fractions of synthetic oils such as bitumen, coal oil, shale oil or the like. Especially suitable feeds are oils containing more than 10 ppm (wt) of metals such as nickel and vanadium. Asphaltic fractions, e.g., oils containing 10 weight percent or more of asphaltenes, are also especially suitable for upgrading according to the process employing the present catalyst. Especially suitable feeds are those oils having an API Gravity below about 25°, or a Conradson carbon residue of at least 7%. Particularly suitable heavy oil feeds are those in which at least 10 weight percent of the oils boils at a temperature above 550° C. Such heavy oils are not the only preferred feeds, however, since the present catalyst can be used effectively for demetalizing lighter oils, such as potential catalytic cracking feeds boiling in the range from roughly, 210° C. to 550° C., especially gas oils with a substantial fraction boiling in the range from 250° C. to 475° C.

The catalyst of the invention is particularly useful for catalytically hydrogen treating hydrocarbon feeds. In hydrogen treating, which may also be called hydroprocessing or hydroconversion, the oil feed to be treated is mixed with hydrogen, and the mixture is contacted with the catalyst in a suitable reaction zone at hydrogen treating conditions.

Generic hydrogen treating conditions include a reaction zone temperature in the range from about 200° C. to 540° C., a total pressure in the range from about 1 atmosphere to about 300 atmospheres, with a hydrogen partial pressure of from 0 to 200 atmospheres, a hydrogen-to-oil feed ratio of from 0 to 9000 standard cubic liters per liter of oil (SCLL), and a liquid hourly space velocity (LHSV) of about 0.1 to about 25 volumes per hour per volume.

Among the specific hydrogen treating, hydroconversion, or hydrogen processing operations for which the present catalyst is particularly suitable are hydrocracking, hydrodesulfurization, hydrodenitrification, hydrodemetalation and hydroconversion of asphaltenes. The present catalyst is especially suitable for use in hydrodemetalizing heavy oils and in selectively hydrocracking asphaltenes from asphaltinic stocks. Reaction conditions used in hydrodemetalation and asphaltenes cracking preferably include a temperature in the range from 200° to 500° C., a hydrogen pressure of 20 to 300 atmospheres, a hydrogen-to-feed oil rate of 1000 to 100,000 standard cubic feet per barrel and a LHSV of about 0.1 to 5.

The hydroconversion processes carried out with the present catalyst may be performed in a batch-type or, preferably, a continuous-type system. The catalyst may be used in the form of a slurry in the feed, a fixed bed, a moving bed, an ebullated or fluidized bed. Suitable conventional reaction zones, such as reactor vessels, are well known to those skilled in the art. In the case of a fixed bed operation, the feed oil and hydrogen can be contacted with the catalyst bed in, for example, upward flow, downward flow or radial flow.

In one preferred embodiment, the present catalyst is used in carrying out the first stage of a two-stage hydroconversion operation. Using the present catalyst in the first stage at hydrodemetalation conditions in a first reaction zone, the feed oil is freed from a large fraction of its metals and the asphaltenes content of the oil is substantially reduced. In the second stage, the primary hydroconversion carried out is hydrodesulfurization, using conventional hydrodesulfurization conditions and a conventional catalyst selected for its hydrodesulfurization activity in a second reaction zone. In such a two-stage operation, suitable hydrodesulfurization conditions for use in the second stage include a temperature of 150° C. to 425° C., a hydrogen pressure of 5 to 15 atmospheres, a hydrogen-to-feed oil rate of up to 2,000 SCFB and a liquid hourly space velocity of 0.1 to 5.

The following Illustrative Embodiments describe preferred embodiments of the preparation of the present catalyst and its use in demetalizing a heavy hydrocarbon feed.

ILLUSTRATIVE EMBODIMENT I

Naturally occurring mineral imogolite is obtained and crushed in dry form to one-half inch diameter particles. The particles are slurried in water at a water-:imogolite volume ratio of 9:1 and subjected to further comminution in conventional clay handling apparatus, such as a blunger, to provide imogolite particles of less than 5 micron diameter. Silt and sand particles larger than 5 microns are settled out of the dispersion. The imogolite is then concentrated by filtration to provide a wet filter cake. An alumina hydrogel slurry is prepared conventionally, as by peptizing a commercially available boehmite alumina (e.g. Catapal) by violent agitation with a peptizing agent such as nitric acid or formic acid. The hydrogel may also be prepared by precipitation from an aqueous solution of aluminum nitrate by addition of a base such as ammonium hydroxide. After appropriate washing to remove undesired ions, the hydrogel is mixed with sufficient water to provide 15 weight percent alumina in a slurry. A mixture of imogolite and alumina hydrogel is then formed by adding the filter cake to the hydrogel slurry at an imogolite:alumina weight ratio of 3:1. The rods of imogolite are then dispersed, randomly oriented and homogeneously mixed with the alumina. Proper blending of the components is important in order to obtain the advantageous physical properties desired in the final catalyst. A preferred blending-dispersing procedure is, first, to agitate the imogolite-alumina mixture violently in a Waring blender, Cowles dissolver, or the like, for about 20 minutes. At this stage the solids should be in slurry form in water with about 25 weight percent solids. Proper dispersal of the imogolite rods is indicated by a slurry viscosity of above that of water. The imogolite rods in the slurry are then further dispersed by passing the slurry two or three times through a stone colloid mill, e.g., a Morehouse mill, or the like. Clearance of the mill should be adjusted to provide a temperature rise of 6°–10° C. during each pass, indicating sufficient shear for proper dispersion of the rods in the mixture. The slurry is then placed in a steam heated partially closed vessel to reduce the water content of the slurry to about 50 weight percent. The water content is adjusted for best results in shaping. In the case of extrusion, the mixture is then extruded to form particles of about 1.5 to 4 millimeters diameter. The extrudate is then dried for about one hour at 150° C. and then calcined at 565° C. for about 2 hours. The resulting catalytic bodies have a pore volume of about 0.7 to 1.0 cc/g. About 60% of the pore volume is provided by pores with diameters above 200 Angstrom units, as measured by nitrogen desorption isotherm. The catalyst is effective as prepared or can be impregnated with a sufficient amount of an aqueous solution of ammonium molybdate to provide 5 weight percent molybdenum (as elemental metal), and with a sufficient amount of an aqueous cobalt nitrate solution to provide 2.5 weight percent cobalt in the finished catalyst.

ILLUSTRATIVE EMBODIMENT II

The catalyst prepared as described in ILLUSTRATIVE EMBODIMENT I is employed for hydrodemetalizing a heavy petroleum fraction and for simultaneously selectively hydrocracking the heptane-insoluble asphaltenes in the petroleum fraction. The catalyst is employed as a fixed bed in a conventional hydroconversion system. The feed is mixed with hydrogen and passed over the catalyst bed at a temperature of about 410° C. with a hydrogen partial pressure of about 135 atmospheres. The LHSV employed is about 1.5 per hour. A hydrogen/oil ratio of about 1000 nanoliters per liter is employed. The product oil is analyzed and found to be substantially lower in vanadium, nickel and heptane-insoluble components than the feed.

What is claimed is:

1. A process for hydrogen treating a hydrocarbon feed which comprises contacting said feed, at hydrogen treating conditions, with a catalyst comprising shaped catalytic bodies including (1) dispersed rods of fibrous form imogolite and (2) at least one inorganic oxide gel, said gel bonding said rods together in substantially random mutual orientation in said catalytic bodies, at least 40% of the total pore volume in said catalytic bodies being provided by pores with diameters between about 200 Angstrom units and 1,000 Angstrom units.

2. A process as defined in claim 1 wherein said inorganic oxide gel is present in said composition in an amount between 30 and 50 weight percent of said rods.

3. A process as defined in claim 1 wherein the average length of said rods is between 2% and 10% of the average diameter of said shaped catalytic bodies.

4. A process as defined in claim 1 wherein said rods have an average length:diameter ratio between about 5:1 and 100:1, said diameter being the maximum diameter of said rods normal to said length.

5. A process as defined in claim 1 wherein said catalytic bodies further include from about 0.1 to about 10 weight percent of at least one metal selected from chromium, molybdenum, tungsten and vanadium.

6. A process as defined in claim 1 wherein said catalytic bodies further include from about 0.1 to about 10 weight percent of at least one metal selected from iron, nickel and cobalt.

7. A process for hydrodemetalizing a hydrocarbon feed which comprises contacting said feed, at hydrodemetalizing conditions, with a catalyst including (1) dispersed rods of fibrous form imogolite and (2) from 10 to 50 weight percent, based on said rods, of at least one inorganic oxide gel, said gel bonding said rods together in substantially random mutual orientation in said catalytic bodies.

8. A process as defined in claim 7 wherein said inorganic oxide gel is present in said composition in an amount between 30 and 50 weight percent of said rods.

9. A process as defined in claim 7 wherein the average length of said rods is between 2% and 10% of the average diameter of said shaped catalytic bodies.

10. A process is defined in claim 7 wherein said rods have an average length:diameter ratio between about 5:1 and 100:1, where the diameter is the maximum diameter of said rods.

11. A process as defined in claim 7 wherein said catalytic bodies further include from about 0.1 to about 10 weight percent of at least one metal selected from chromium, molybdenum, tungsten and vanadium.

12. A process as defined in claim 7 wherein said catalytic bodies further include from about 0.1 to about 10 weight percent of at least one metal selected from iron, nickel and cobalt.

13. A process as defined in claim 1 wherein at least about 60% of the total pore volume in said catalytic bodies is provided by pores with diameters above 200 Angstrom units, as measured by nitrogen desorption isotherm.

14. A process as defined in claim 7 wherein at least about 60% of the total pore volume in said catalytic bodies is provided by pores with diameters above 200 Angstrom units as measured by nitrogen desorption isotherm.

* * * * *